US011178618B2

(12) United States Patent
He et al.

(10) Patent No.: US 11,178,618 B2
(45) Date of Patent: Nov. 16, 2021

(54) ADAPTATION OF POWER PARAMETER VALUES IN DISCONTINUOUS RECEPTION

(71) Applicant: QUALCOMM Incorporated, San Diego, CA (US)

(72) Inventors: Linhai He, San Diego, CA (US); Gavin Bernard Horn, La Jolla, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 16/731,341

(22) Filed: Dec. 31, 2019

(65) Prior Publication Data
US 2020/0229100 A1 Jul. 16, 2020

Related U.S. Application Data

(60) Provisional application No. 62/790,726, filed on Jan. 10, 2019.

(51) Int. Cl.
*H04W 52/02* (2009.01)
*H04W 76/28* (2018.01)
(Continued)

(52) U.S. Cl.
CPC ... *H04W 52/0274* (2013.01); *H04W 28/0284* (2013.01); *H04W 52/0229* (2013.01);
(Continued)

(58) Field of Classification Search
CPC ............. H04W 52/0274; H04W 76/28; H04W 52/0229; H04W 28/0284; H04W 80/02;
(Continued)

(56) References Cited

U.S. PATENT DOCUMENTS

| 2011/0199934 | A1 | 8/2011 | Olofsson et al. | |
| 2013/0308507 | A1* | 11/2013 | Wanstedt | H04W 52/0216 370/311 |

(Continued)

OTHER PUBLICATIONS

3GPP TSG RAN WG1 Meeting #94bis ; R1-1810155, Chengdu, China, Oct. 8-12, 2018; (Year: 2018).*

(Continued)

*Primary Examiner* — Hassan A Phillips
*Assistant Examiner* — Mohammed S Chowdhury
(74) *Attorney, Agent, or Firm* — Harrity & Harrity, LLP; Nerrie M. Zohn

(57) ABSTRACT

Some techniques and apparatuses described herein permit a user equipment (UE) to transition among different power settings for different parameters that impact the amount of power consumed by the UE. Such transitions may be configured to occur during a discontinuous reception (DRX) active time to provide power savings during the DRX active time or increase throughput during the DRX active time. In some aspects, the transitions may be signaled by a base station based at least in part on traffic volume for the UE, which may assist with improving throughput (e.g., when data is available for the UE), and which may assist with extending battery life of the UE (e.g., when data is not available for the UE). In some aspects, such transitions and associated parameter values may be preconfigured or a transition may be triggered by expiration of a timer, thereby reducing signaling overhead.

30 Claims, 11 Drawing Sheets

(51) Int. Cl.
*H04W 28/02* (2009.01)
*H04W 80/02* (2009.01)
*H04W 76/27* (2018.01)
*H04W 72/04* (2009.01)

(52) U.S. Cl.
CPC ......... *H04W 72/042* (2013.01); *H04W 76/27* (2018.02); *H04W 76/28* (2018.02); *H04W 80/02* (2013.01)

(58) Field of Classification Search
CPC ............... H04W 76/27; H04W 72/042; H04W 28/0205; H04W 52/0254; H04W 52/0235; H04W 52/0216; H04W 28/0221; Y02D 30/70
See application file for complete search history.

(56) References Cited

U.S. PATENT DOCUMENTS

| | | | | |
|---|---|---|---|---|
| 2015/0131505 | A1* | 5/2015 | Dai | H04W 16/10 370/311 |
| 2015/0304955 | A1* | 10/2015 | Manepalli | H04W 76/28 370/311 |
| 2016/0302154 | A1* | 10/2016 | Wang | H04W 76/28 |
| 2019/0149380 | A1* | 5/2019 | Babaei | H04L 5/001 370/330 |
| 2019/0327678 | A1* | 10/2019 | Lin | H04L 5/0055 |
| 2020/0037247 | A1* | 1/2020 | Liao | H04W 72/0453 |
| 2020/0100179 | A1* | 3/2020 | Zhou | G06F 1/3209 |
| 2020/0107266 | A1* | 4/2020 | Liao | H04W 76/28 |
| 2021/0028844 | A1* | 1/2021 | Song | H04W 52/02 |

OTHER PUBLICATIONS

3GPP TSG RAN WG1 Meeting #95; R1-1812362, Spokane, USA, Nov. 12-16, 2018; Source: MediaTek Inc.; Title: Triggering adaptation for UE power saving; (Year: 2018).*

3GPP TSG RAN WG1 Meeting #95; R1-1812641, Spokane, USA, Nov. 12-16, 2018; Source: CATT, Title: UE Power Saving Scheme with Adaptation; (Year: 2018).*

International Search Report and Written Opinion—PCT/US2020/012001—ISA/EPO—dated Apr. 3, 2020.

Qualcomm Inc: "Adaptation of Power-Related Parameters to DRX states", 3GPP Draft, 3GPP TSG-RAN WG2 Meeting #106, R2-1906708 Adaptation of Power-Related Parameters to DRX states, 3rd Generation Partnership Project (3GPP), Mobile Competence Centre, 650, Route Des Lucioies, F-06921 Sophia-Antipolis Cedex, vol. RAN WG2. No. Reno, USA, May 13, 2019-May 17, 2019, May 3, 2019 (May 3, 2019), XP051711015, pp. 1-4, Retrieved from the Internet: URL: http://www.3gpp.org/ftp/tsg%5Fran/WG2%5FRL2/TSGR2%5F106/Docs/R2%2D1906708%2Ezip, [retrieved on May 3, 2019], the whole document.

* cited by examiner

ADAPTATION OF POWER PARAMETER VALUES IN DISCONTINUOUS RECEPTION

CROSS-REFERENCE TO RELATED APPLICATION

This application claims priority to U.S. Provisional Patent Application No. 62/790,726, filed on Jan. 10, 2019, entitled "ADAPTATION OF POWER PARAMETER VALUES IN DISCONTINUOUS RECEPTION," which is hereby expressly incorporated by reference herein.

BACKGROUND

Field

Aspects of the present disclosure generally relate to wireless communication and to techniques and apparatuses for adaptation of power parameter values in discontinuous reception (DRX).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

Battery life is an important consideration for UEs, especially for UEs for which battery replacement may be difficult, such as narrowband Internet of Things (NB-IoT) UEs that operate in remote geographic areas. However, throughput is also an important consideration for UEs, and often directly conflicts with power savings and battery life since more power is required for high throughput as compared to low throughput. In some cases, a UE may use a DRX cycle to transition between an inactive state and an active state to conserve battery power when there is no data for the UE to transmit or receive. However, a UE may benefit from additional power saving in addition to a DRX cycle.

Some techniques and apparatuses described herein permit a UE to transition among different power settings for different parameters that impact the amount of power consumed by the UE (e.g., to communicate with a base station or to perform other operations). Such transitions may be configured to occur during a DRX active time (also referred to as an active state) to provide power savings during the DRX active time or increase throughput during the DRX active time. In some aspects, the transitions may be signaled by a base station based at least in part on traffic volume for the UE, which may assist with improving throughput (e.g., when data is available for the UE), and which may assist with extending battery life of the UE (e.g., when data is not available for the UE). Additionally, or alternatively, such transitions and associated parameter values may be preconfigured or a transition may be triggered by expiration of a timer, thereby reducing signaling overhead that would otherwise be needed to signal each transition.

In an aspect of the disclosure, a method, a user equipment (UE), a base station, an apparatus, and a computer program product are provided.

In some aspects, the method may by performed by a UE. The method may include operating using a first configuration during a first stage of a DRX active time configured for the UE, wherein the first configuration is based at least in part on a first set of parameter values associated with a first power consumption rate; and operating using a second configuration during a second stage of the DRX active time, wherein the second configuration is based at least in part on a second set of parameter values associated with a second power consumption rate.

In some aspects, the UE may include a memory and one or more processors operatively coupled to the memory. The memory and the one or more processors may be configured to operate using a first configuration during a first stage of a DRX active time configured for the UE, wherein the first configuration is based at least in part on a first set of parameter values associated with a first power consumption rate; and operate using a second configuration during a second stage of the DRX active time, wherein the second configuration is based at least in part on a second set of parameter values associated with a second power consumption rate.

In some aspects, the apparatus may include means for operating using a first configuration during a first stage of a DRX active time configured for the apparatus, wherein the first configuration is based at least in part on a first set of parameter values associated with a first power consumption rate; and means for operating using a second configuration during a second stage of the DRX active time, wherein the second configuration is based at least in part on a second set of parameter values associated with a second power consumption rate.

In some aspects, the computer program product may include a non-transitory computer-readable medium storing one or more instructions. The one or more instructions, when executed by one or more processors of a UE, may cause the one or more processors to operate using a first configuration during a first stage of a DRX active time configured for the UE, wherein the first configuration is based at least in part on a first set of parameter values associated with a first power consumption rate; and operate using a second configuration during a second stage of the DRX active time, wherein the second configuration is based at least in part on a second set of parameter values associated with a second power consumption rate.

In some aspects, the method may by performed by a base station. The method may include transmitting, to a UE, an indication of a plurality of sets of parameter values, wherein different sets of parameter values are associated with different power consumption rates by the UE; transmitting, to the UE, an indication of a first set of parameter values, of the plurality of sets of parameter values, to be applied by the UE during a first stage of a DRX active time configured for the UE; and communicating with the UE during the first stage of the DRX active time based at least in part on the first set of parameter values.

In some aspects, the base station may include a memory and one or more processors operatively coupled to the memory. The memory and the one or more processors may be configured to transmit, to a UE, an indication of a plurality of sets of parameter values, wherein different sets of parameter values are associated with different power consumption rates by the UE; transmit, to the UE, an indication of a first set of parameter values, of the plurality of sets of parameter values, to be applied by the UE during a first stage of a DRX active time configured for the UE; and communicate with the UE during the first stage of the DRX active time based at least in part on the first set of parameter values.

In some aspects, the apparatus may include means for transmitting, to a UE, an indication of a plurality of sets of parameter values, wherein different sets of parameter values are associated with different power consumption rates by the UE; means for transmitting, to the UE, an indication of a first set of parameter values, of the plurality of sets of parameter values, to be applied by the UE during a first stage of a DRX active time configured for the UE; and means for communicating with the UE during the first stage of the DRX active time based at least in part on the first set of parameter values.

In some aspects, the computer program product may include a non-transitory computer-readable medium storing one or more instructions. The one or more instructions, when executed by one or more processors of a base station, may cause the one or more processors to transmit, to a UE, an indication of a plurality of sets of parameter values, wherein different sets of parameter values are associated with different power consumption rates by the UE; transmit, to the UE, an indication of a first set of parameter values, of the plurality of sets of parameter values, to be applied by the UE during a first stage of a DRX active time configured for the UE; and communicate with the UE during the first stage of the DRX active time based at least in part on the first set of parameter values.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
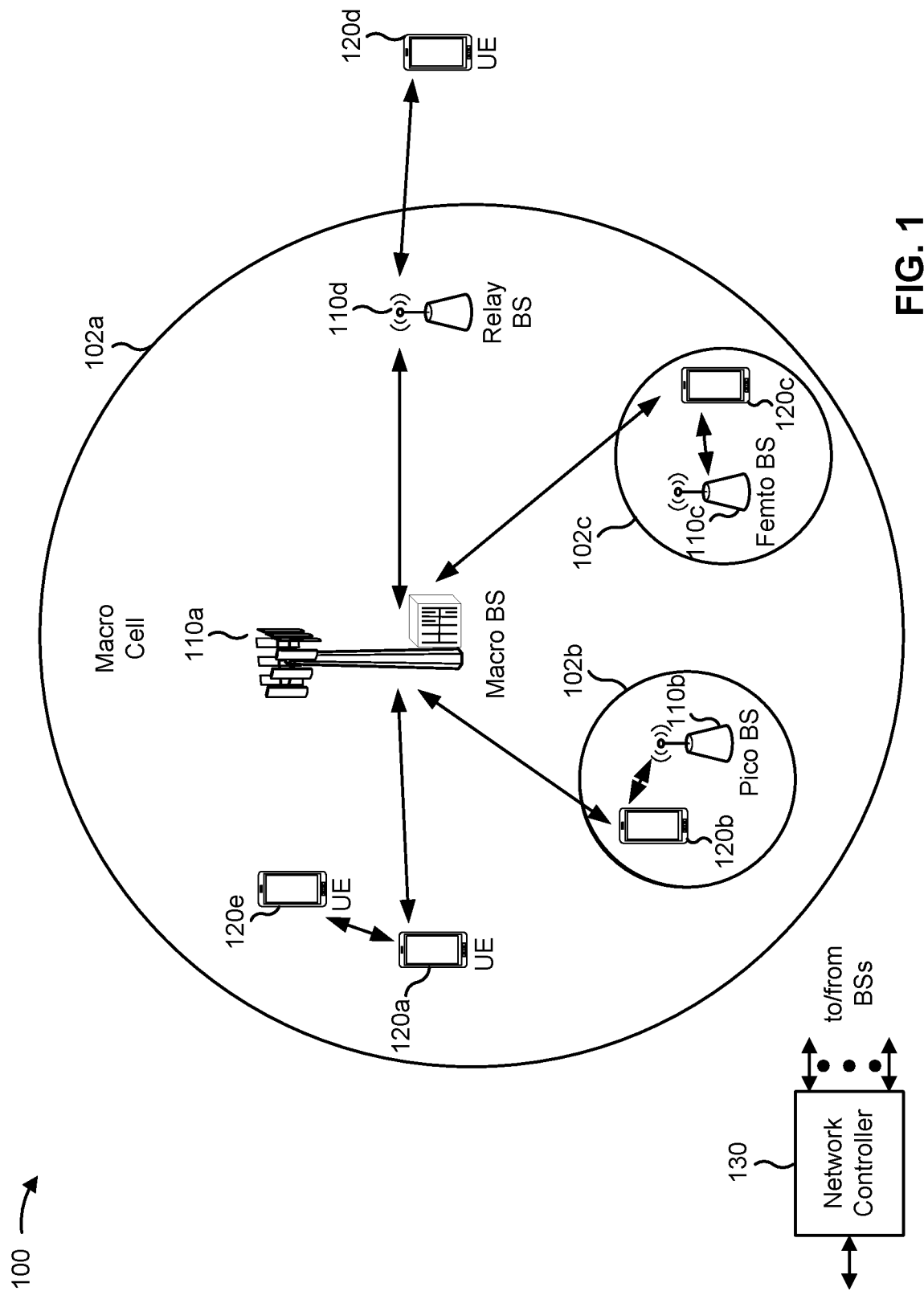
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
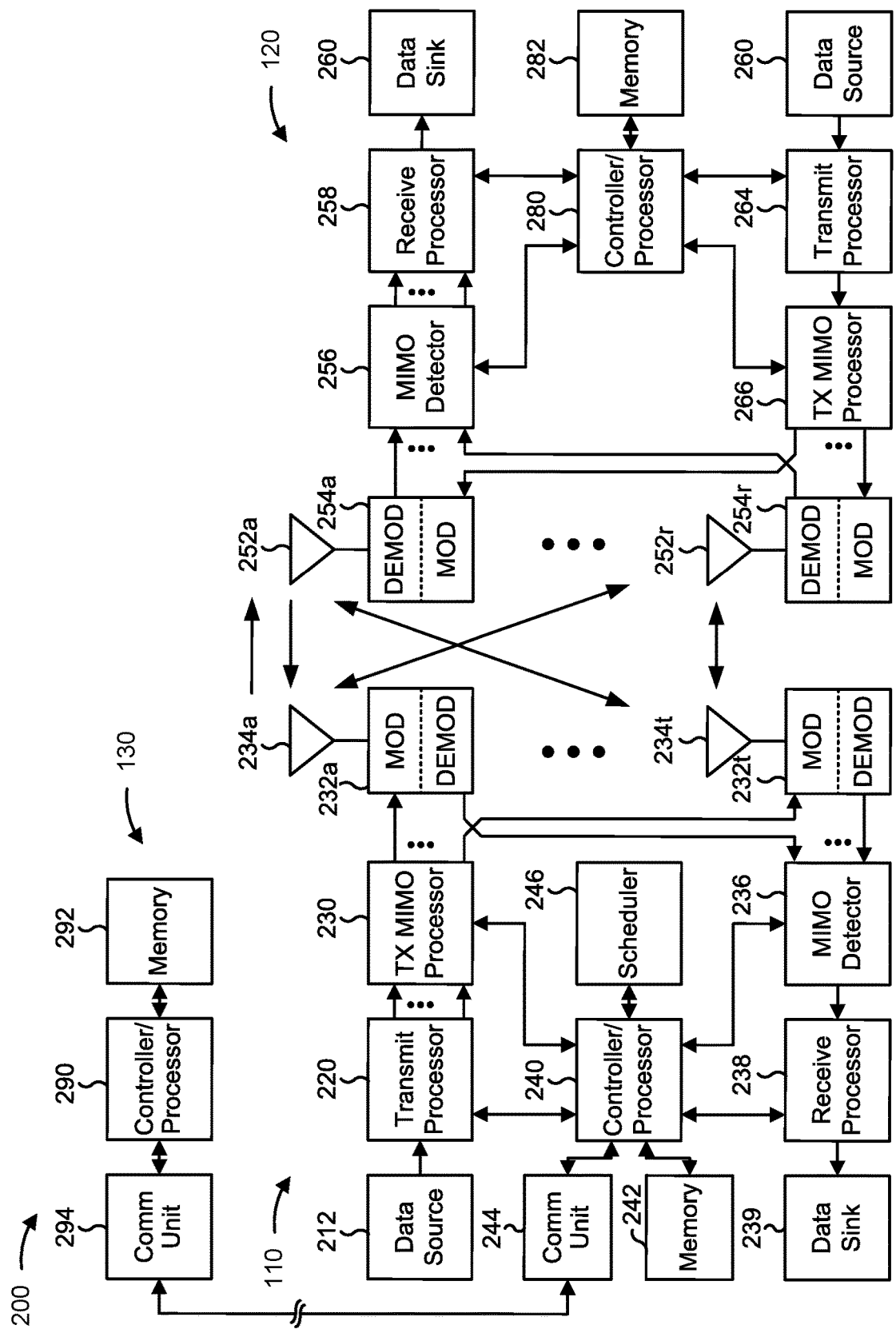
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with adaptation of power parameter values in DRX, as described in more detail elsewhere herein. For example, controller/processor 240 of base station 110, controller/processor 280 of UE 120, and/or any other component(s) of FIG. 2 may perform or direct operations of, for example, method 600 of FIG. 6, method 700 of FIG. 7, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Battery life is an important consideration for UEs 120, especially for UEs 120 for which battery replacement may be difficult, such as NB-IoT UEs that operate in a remote geographic area. However, throughput is also an important consideration for UEs 120, and often directly conflicts with power savings and battery life since more power is required for high throughput as compared to low throughput. In some cases, a UE 120 may use a DRX cycle to transition between an inactive state and an active state to conserve battery power when there is no data for the UE 120 to transmit or receive. However, a UE 120 may benefit from additional power saving in addition to a DRX cycle.

Some techniques and apparatuses described herein permit a UE 120 to transition among different power settings for different parameters that impact the amount of power consumed by the UE 120 (e.g., to communicate with a base station 110 or to perform other operations). Such transitions may be configured to occur during a DRX active time (also referred to as an active state) to provide power savings during the DRX active time or increase throughput during the DRX active time. In some aspects, the transitions may be signaled by a base station 110 based at least in part on traffic volume for the UE 120, which may assist with improving throughput (e.g., when data is available for the UE 120), and which may assist with extending battery life of the UE 120 (e.g., when data is not available for the UE 120). Additionally, or alternatively, such transitions and associated parameter values may be preconfigured or a transition may be triggered by expiration of a timer, thereby reducing signaling overhead that would otherwise be needed to signal each transition.

Figure 3:
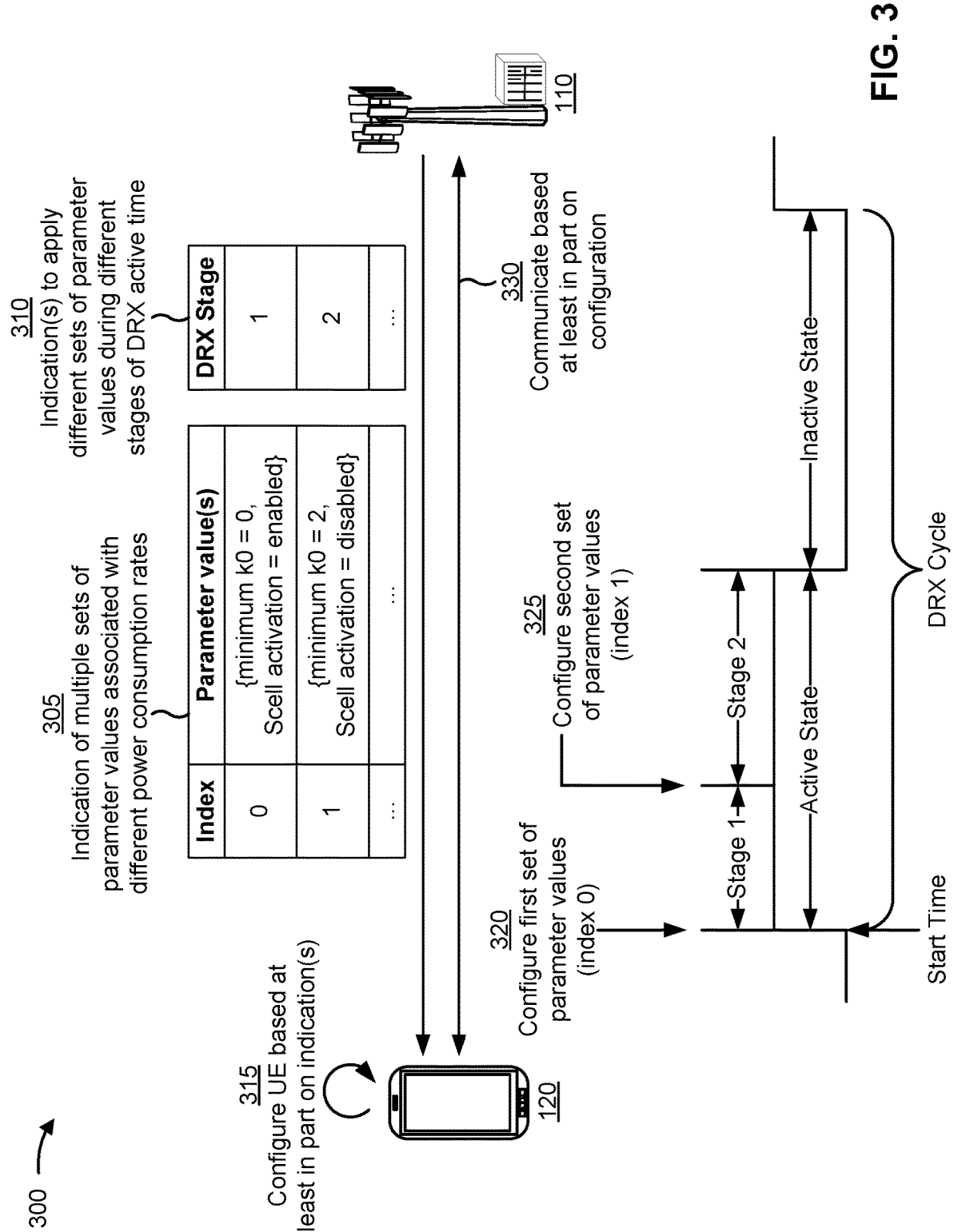
FIGS. 3-5 are diagrams illustrating examples of adaptation of power parameter values in DRX.

FIG. 3 is a diagram illustrating an example 300 of adaptation of power parameter values in DRX.

As shown by reference number 305, a UE 120 may receive, from a base station 110, an indication of multiple sets of parameter values. Different sets of parameter values, of the multiple sets, may be associated with different power consumption rates (e.g., power settings) when applied by the UE 120. For example, a first set of parameter values, shown as being indicated by an index value of zero, is shown as including a first parameter value of "0" for a first parameter of "minimum k0" and a second parameter value of "enabled" for a second parameter of "Scell activation." As another example, a second set of parameter values, shown as being indicated by an index value of one, is shown as including a first parameter value of "2" for the first parameter of "minimum k0" and a second parameter value of "disabled" for the second parameter of "Scell activation." In this case, the first set of parameter values may correspond to a high throughput (and high power) setting for the UE 120, and the second set of parameter values may correspond to a low power (and low throughput) setting for the UE 120. Thus, when the UE 120 operates using the first set of parameter values (e.g., by configuring the "minimum k0" parameter with the value of "0" and the "Scell activation" parameter with the value of "enabled"), the UE 120 may consume power at a faster rate than when the UE 120 operates using the second set of parameter values (e.g., by configuring the "minimum k0" parameter with the value of "2" and the "Scell activation" parameter with the value of "disabled"). The base station 110 may select the first set of parameter values and/or the second set of parameter values from the multiple sets of parameter values, and may indicate the selected set of parameter values to be applied by the UE 120, as described in more detail below.

In some aspects, the multiple sets of parameter values may be predetermined (e.g., specified according to a wireless communication standard) and/or may be indicated to the UE 120 by the base station 110 in a signaling message, such as a radio resource control (RRC) message (e.g., an RRC configuration message, an RRC reconfiguration message, and/or the like) and/or another signaling message. In some aspects, the base station 110 may determine the multiple sets of parameter values based at least in part on a capability of the UE 120, a device type of the UE 120 (e.g., a UE class, a UE category, and/or the like), and/or the like. For example, the UE 120 may transmit a UE capability report to the base station 110. The UE capability report may indicate one or more parameters that the UE 120 is capable of configuring. The base station 110 may determine the multiple sets of parameter values based at least in part on such a capability. In this way, the base station 110 may ensure that the UE 120 is capable of reconfiguring parameters indicated by the base station 110, thereby reducing errors, improving battery life and/or throughput (e.g., according to the configuration), and/or the like.

Although example 300 of FIG. 3 shows the sets of parameter values being indicated using an index, a different indicator may be used in some aspects. Additionally, or alternatively, the sets of parameter values may be explicitly indicated (e.g., included in a signaling message) without using an index or a similar indicator. When an index (or a similar indicator) is used, a relationship between the index and a corresponding set of parameter values may be predetermined (e.g., specified according to a wireless communication standard), in some aspects. Additionally, or alternatively, the relationship may be indicated to the UE 120 by the base station 110 in a signaling message, such as an RRC message and/or another signaling message.

Furthermore, while example 300 of FIG. 3 shows two sets of parameter values being indicated, a different number of sets of parameter values may be indicated in some aspects. In some aspects, different sets of parameter values may include values for the same parameters and/or may include the same number of parameter values, as shown in FIG. 3. In some aspects, different sets of parameter values may include values for different parameters, values for different combinations of parameters, and/or values for different numbers of parameters.

As shown by reference number 310, the UE 120 may receive, from the base station 110, an indication of a set of parameter values to be applied by the UE 120 during a stage of a DRX active time. For example, the base station 110 may indicate that the UE 120 is to apply the first set of parameter values during a first stage of the DRX active time, may indicate that the UE 120 is to apply the second set of parameter values during a second stage of the DRX active time, and/or the like. The DRX active time may include an active state of a DRX cycle (e.g., when the UE 120 is not in an inactive state). For example, the DRX active time may include a DRX on-duration. Additionally, or alternatively, the DRX active time may include a time period by which the DRX on-duration is extended (e.g., due to a DRX inactivity timer being reset upon transmission or reception of new data by the UE 120). Different stages of the DRX active time may include different non-overlapping time periods of the DRX active time. In some aspects, the DRX cycle may be configured for the UE 120 according to a DRX configuration, which may be indicated to the UE 120 by the base station 110 in an RRC message and/or the like. Additionally, or alternatively, different stages of the DRX active time and sets of parameter values, corresponding to one or more of the stages, may be indicated in the RRC message and/or in association with indicating the DRX configuration.

In some aspects, the stages may be predefined to have a fixed duration of time, and a transition between stages may be triggered when the duration of time elapses. In some aspects, a transition between stages may be triggered based at least in part on expiration of a timer (e.g., a first stage data inactivity (FSDI) timer and/or the like), may be triggered based at least in part on a signal received from a base station 110, and/or the like. Upon determining to transition between stages, the UE 120 may configure and/or reconfigure one or more parameters using an indicated set of parameter values, as described in more detail below.

In some aspects, the base station 110 may select a set of parameter values to be applied by the UE 120 based at least in part on a network traffic load determined and/or estimated by the base station 110. For example, the base station 110 may estimate a traffic load for the UE 120 (e.g., based at least in part on network traffic associated with other UEs 120, historical network traffic, and/or the like), and may determine the set of parameter values to be applied (e.g., at a start time of the DRX active time) based at least in part on the estimated traffic load. In some aspects, the base station 110 may determine that a high percentage (e.g., satisfying a threshold) of DRX on-durations and/or DRX active times, for UEs 120 in communication with the base station 110, are associated with or estimated to be associated with network traffic (and/or a threshold amount of network traffic). In this case, the base station 110 may configure the UE 120 with a set of parameter values that results in a high throughput (e.g., and high power consumption) power setting for the UE 120. For example, the base station 110 may configure the UE 120 with a wide bandwidth part that is larger than a threshold, a short downlink control channel monitoring periodicity, a large number of MIMO layers, a short hybrid automatic repeat request (HARQ) timeline, and/or the like.

Conversely, the base station 110 may determine that a low percentage (e.g., not satisfying a threshold) of DRX on-durations and/or DRX active times, for UEs 120 in communication with the base station 110, are associated with or estimated to be associated with network traffic (and/or a threshold amount of network traffic). In this case, the base station 110 may configure the UE 120 with a set of parameter values that results in a low power consumption (e.g., and low throughput) power setting for the UE 120. For example, the base station 110 may configure the UE 120 with a narrow bandwidth part, a long downlink control channel monitoring periodicity, a small number of MIMO layers, a long HARQ timeline, and/or the like.

Additionally, or alternatively, the base station 110 may select a set of parameter values based at least in part on a capability of the UE 120, a device type of the UE 120 (e.g., a UE class, a UE category, and/or the like), and/or the like. For example, the UE 120 may transmit a UE capability report to the base station 110. The UE capability report may indicate, for one or more parameters, one or more parameter values with which the UE 120 is capable of configuring a parameter. The base station 110 may select a set of parameter values based at least in part on such a capability. In this way, the base station 110 may ensure that the UE 120 is capable of reconfiguring parameters using parameter values indicated by the base station 110, thereby reducing errors, improving battery life and/or throughput (e.g., according to the configuration), and/or the like.

In some aspects, the indication of the set of parameter values to be applied may be indicated by the base station 110 to the UE 120 in a signaling message, such as a wake-up signal, downlink control information (DCI), a media access control (MAC) control element (CE) (MAC-CE), and/or the like.

As shown by reference number 315, the UE 120 may configure the UE 120 to operate based at least in part on the indication(s) received from the base station 110. For example, the UE 120 may configure a set of parameters with the first set of parameter values for UE operations performed during the first stage of the DRX active time. In this case, the UE 120 may operate using a first configuration during the first stage of the DRX active time, where the first configuration is based at least in part on the first set of parameter values (e.g., associated with a first power consumption rate). When the UE 120 determines to transition from the first stage to the second stage of the DRX active time (as described elsewhere herein), the UE 120 may configure a set of parameters (e.g., the same set of parameters or a different set of parameters than those configured for the first stage) with the second set of parameter values for UE operations performed during the second stage of the DRX active time. In this case, the UE 120 may operate using a second configuration during the second stage of the DRX active time, where the second configuration is based at least in part on the second set of parameter values (e.g., associated with a second power consumption rate).

As shown by reference number 320, the UE 120 may configure itself using the first set of parameter values (e.g., corresponding to the index value of 0 in example 300) for operations performed during a first stage of a DRX active time (e.g., shown as "Stage 1" of "Active State"). For example, at the start of the first stage, the UE 120 may configure the "minimum k0" parameter to have a value of zero and may configure the "Scell activation" parameter to have a value of "enabled." In example, 300, the first stage of the DRX active time includes a start time of the DRX active time (e.g., a time at which the UE 120 transitions from a DRX inactive state to a DRX active state). In some aspects, the first stage may correspond to a different time period of the DRX active time (e.g., that does not include the start time of the DRX active time), such as a time period that begins when a DRX inactivity timer is reset.

As shown by reference number 325, the UE 120 may determine to transition from a first stage of the DRX active time to a second stage of the DRX active time (shown as "Stage 2" of "Active State"). Based at least in part on determining to transition from the first stage to the second stage, the UE 120 may configure itself using the second set of parameter values (e.g., corresponding to the index value of 1 in example 300) for operations performed during the second stage. For example, at the start of the second stage, the UE 120 may configure the "minimum k0" parameter to have a value of two and may configure the "Scell activation" parameter to have a value of "disabled." Additional details regarding determining to transition from the first stage to the second stage are described below in connection with FIGS. 4 and 5.

Although operations are described herein in connection with two stages of a DRX active time, in some aspects, such operations may apply to more than two stages, such as three stages (e.g., for a low power setting, an intermediate power setting, and a high power setting), four stages, and/or the like. In some aspects, each stage may be associated with a different combinations of parameter values. In some aspects, at least two of the stages may be associated with different combinations of parameter values. For example, in the case of three stages, two of the stages may have the same combination of parameter values, and one of the stages may have a different combination of parameter values than the other two stages. For example, the first set of parameter values may be used for a first stage, the second set of parameter values may be used for a second stage that immediately follows the first stage, and the first set of parameter values may be used again for a third stage that follows the second stage. This scenario may apply, for example, when there is no data for the UE 120 for some time period of the DRX active time, and then there is new data available for the UE 120 at a later time of the DRX active time.

As shown by reference number 330, the UE 120 and/or the base station 110 may communicate based at least in part on the indication(s) transmitted by the base station 110 and/or the parameter values applied by the UE 120. For example, during the first stage of the DRX active time, the UE 120 and the base station 110 may communicate with one another based at least in part on the first set of parameter values (e.g., which may indicate one or more configurations for communications between the UE 120 and the base station 110, as described below). Similarly, during the second stage of the DRX active time, the UE 120 and the base station 110 may communicate with one another based at least in part on the second set of parameter values.

In some aspects, the base station 110 may determine the set of parameter values to be used to communicate with the UE 120 based at least in part on determining an active stage of the DRX active time (e.g., the first stage, the second stage, and/or the like), detecting a transition between stages, and/or the like. For example, the base station 110 may detect a transition based at least in part on signaling such a transition to the UE 120, may detect a transition based at least in part on detecting expiration of a timer (e.g., a same timer as is used by the UE 120, such as a FSDI timer and/or the like), based at least in part on an indication from the UE 120 (e.g., upon expiration of the timer by the UE 120 or autonomous determination by the UE 120 to transition between stages), based at least in part on determining whether data and/or a threshold amount of data is available for the UE 120, and/or the like.

In some aspects, the set of parameter values may include one or more parameter values for one or more frequency domain configuration parameters, such as a parameter relating to a reference signal for bandwidth part (BWP) switching (e.g., whether to enable or disable UE monitoring and/or processing of the reference signal), a parameter relating to a BWP configuration (e.g., a BWP index for a BWP via which the UE 120 is to communicate and/or monitor for a wakeup signal, whether to switch to a default BWP upon wakeup, whether to remain on an active BWP at wakeup, and/or the like), a parameter relating to secondary cell (SCell) activation (e.g., whether SCells are enabled or disabled, shown as "Scell activation" in FIG. 3), a parameter indicating whether to monitor and/or decode a physical downlink control channel (PDCCH) of an SCell, a parameter indicating whether SCells use self-scheduling or cross-carrier scheduling, a parameter indicating whether search spaces are shared across cells (e.g., serving cells), a parameter indicating one or more SCells to which one or more of the above frequency domain configuration parameters are to be applied, and/or the like.

Additionally, or alternatively, the set of parameter values may include one or more parameter values for one or more time domain configuration parameters, such as a parameter indicating a time delay (e.g., in slots, symbols, and/or the like) between DCI (e.g., on the PDCCH) and a corresponding data or reference signal transmission (e.g., where the UE 120 can configure a low power setting during the time delay), a parameter indicating a time domain resource allocation (TDRA) table to be used by the UE 120, and/or the like.

Additionally, or alternatively, the set of parameter values may include one or more parameter values for one or more scheduling configuration parameters, such as a parameter indicating whether to use slot-based or non-slot-based scheduling, a parameter indicating whether multi-slot scheduling is enabled or disabled (e.g., multi-slot scheduling with a single DCI scheduling data or a reference signal in multiple slots), and/or the like.

Additionally, or alternatively, the set of parameter values may include one or more parameter values for one or more MIMO configuration parameters, such as a parameter indicating a number of antennas, panels, and/or beams to be used by the UE 120 and/or the base station 110, a parameter indicating a number of MIMO layers to be used by the UE 120 (e.g., for transmission, for reception, and/or the like), a parameter indicating a maximum number of antennas, panels, beams, layers, and/or rank values to be used by the UE 120, a parameter indicating whether the UE 120 is to process or report measurements of channel state information reference signals (CSI-RS) regardless of whether periodic CSI-RS are configured for the UE 120, and/or the like.

Additionally, or alternatively, the set of parameter values may include one or more parameter values for one or more DRX configuration parameters, such as one or more DRX timer values to be used by the UE 120 (e.g., an on-duration timer, an inactivity timer, a short cycle timer, an FSDI timer, and/or the like), an indication of whether a DRX short cycle is enabled or disabled, and/or the like.

Additionally, or alternatively, the set of parameter values may include one or more parameter values for one or more processing timeline configuration parameters, such as a parameter indicating a minimum timing offset to be used by the UE 120 for one or more k values (e.g., a k0 value indicating a timing between a downlink grant and corresponding downlink data transmission, a k1 value indicating a timing between a downlink data transmission and corresponding acknowledgement (ACK) or negative acknowledgement (NACK) feedback, a k2 value indicating a timing between an uplink grant and a corresponding uplink data transmission, a k3 value indicating a timing between ACK or NACK feedback and a corresponding downlink data retransmission, and/or the like), a parameter indicating a minimum timing offset to be used for CSI (e.g., a timing between DCI and aperiodic CSI-RS), a parameter indicating a HARQ processing timeline, and/or the like. For example, a parameter indicating a minimum k0 value (shown as "minimum k0") is shown in FIG. 3.

Additionally, or alternatively, the set of parameter values may include one or more parameter values for one or more downlink control channel (e.g., PDCCH) configuration parameters, such as a parameter indicating a periodicity of monitoring occasions (e.g., a PDCCH monitoring periodicity), a parameter indicating one or more downlink control channel candidate aggregation levels to be monitored by the UE 120, a parameter indicating a number of downlink control channel candidates to be monitored for one or more configured aggregation levels, a parameter indicating one or more control resource sets (CORESETs) to be monitored by the UE 120, a parameter indicating one or more search space sets to be monitored by the UE 120, a parameter indicating one or more DCI formats to be monitored by the UE 120, a parameter indicating one or more cells to which one or more of the above downlink control channel configuration parameters are to be applied, and/or the like.

Additionally, or alternatively, the set of parameter values may include one or more parameter values for one or more wakeup signal configuration parameters, such as a parameter indicating whether the UE 120 is to monitor for and/or process wakeup signals, and/or the like.

Additionally, or alternatively, the set of parameter values may include one or more parameter values for one or more radio resource management (RRM) configuration parameters, such as a parameter indicating a configuration for RRM, a parameter indicating a periodicity of measurement occasions, a parameter indicating one or more cells to which one or more of the above RRM configuration parameters are to be applied, and/or the like.

By using different power settings (e.g., parameter values) for different parameters that impact the amount of power consumed by the UE 120 (e.g., to communicate with a base station 110 or to perform other operations), the UE 120 may conserve power and/or increase throughput as appropriate during different stages of a DRX active time. For example, battery life of the UE 120 may be extended beyond what can be achieved using a DRX cycle without different power settings for different stages of a DRX active time of the DRX cycle. By signaling transitions between stages and/or configuring parameter values for the UE 120 based at least in part on traffic volume for the UE 120, the base station 110 may assist with improving throughput (e.g., when data is available for the UE 120), and may assist with extending battery life of the UE 120 (e.g., when data is not available for the UE 120). Furthermore, when such transitions and/or associated parameter values are preconfigured, or when a transition is triggered by expiration of a timer, signaling overhead may be reduced.

As indicated above, FIG. 3 is provided as an example. Other examples may differ from what is described with respect to FIG. 3.

Figure 4:
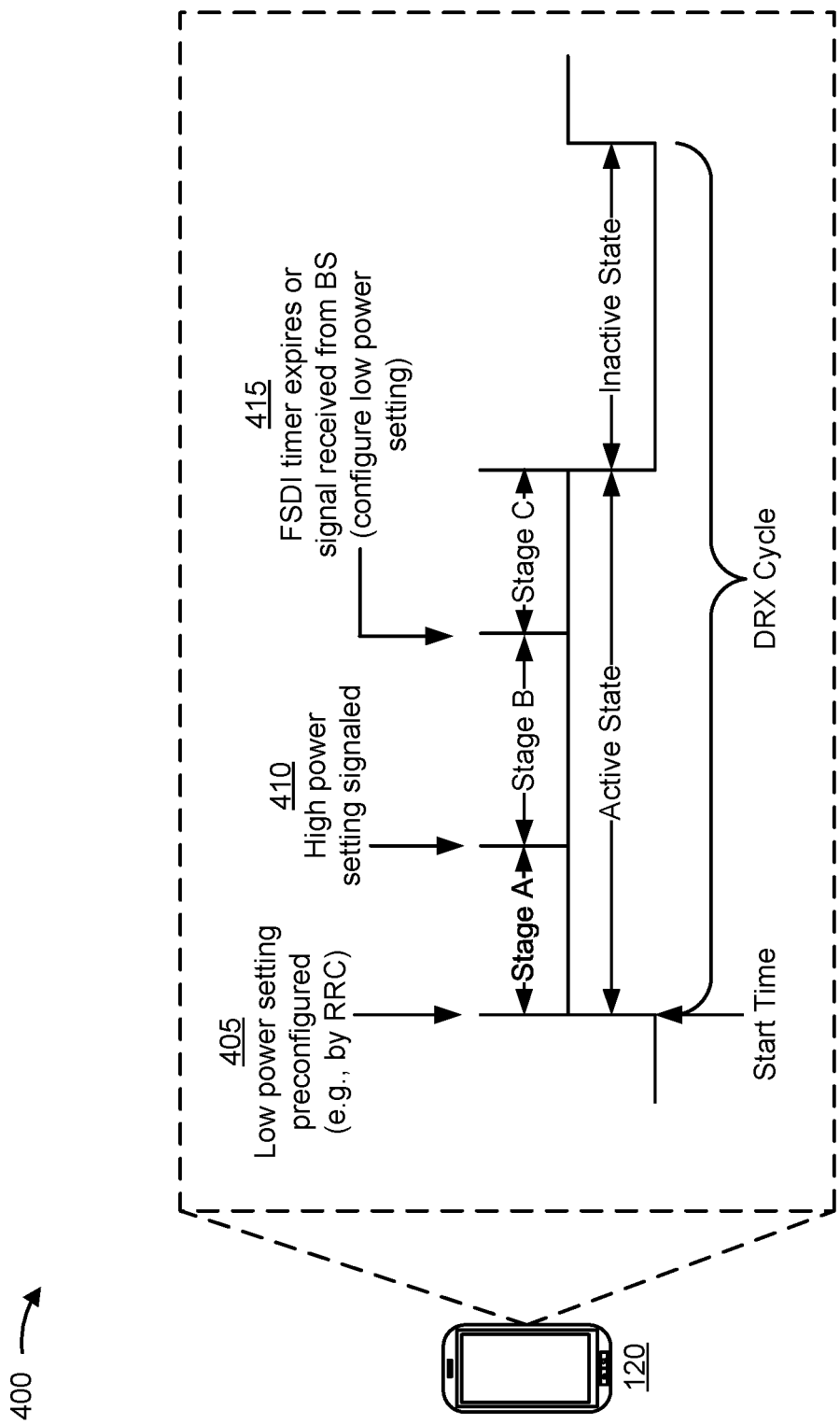

FIG. 4 is a diagram illustrating another example 400 of adaptation of power parameter values in DRX.

As shown by reference number 405, the UE 120 may configure a low power setting (e.g., using the second set of parameter values described above in connection with FIG. 3) at the start of a DRX active time. The start of the DRX active time may be included in a first stage of the DRX active time, shown as Stage A. During this time, there may not be any data available for the UE 120, so the UE 120 may operate using the low power setting (e.g., with a lower power consumption rate than a high power setting, described below) to conserve battery power and extend battery life. In some aspects, the low power setting may be preconfigured for the UE 120, such as in an RRC message. In this case, the RRC message may instruct the UE 120 to configure the low power setting at the start of the DRX active time (e.g., for the first stage). In some aspects, the base station 110 may instruct the UE 120 to use a set of parameters, for the start of the DRX active time, that were being used by the UE 120 at an end of a prior DRX active time.

As shown by reference number 410, the UE 120 may detect a transition from the first stage to a second stage of the DRX active time, shown as Stage B. In example 400, the UE 120 detects this transition based at least in part on receiving a signal from the base station 110. For example, the base station 110 may transmit a signal instructing the UE 120 to configure a high power setting (e.g., using the first set of parameter values described above in connection with FIG. 3), which triggers the second stage of the DRX active time. In some aspects, the signal may be included in DCI, such as DCI that schedules a communication for the UE 120 (e.g., a downlink data communication, a physical downlink shared channel (PDSCH) communication, an uplink communication, a physical uplink shared channel (PUSCH) communication, and/or the like). Additionally, or alternatively, the signal may be included in a MAC-CE and/or another signaling message. The UE 120 may configure the high power setting (e.g., with a greater power consumption rate than the low power setting) and may transmit and/or receive data during the second stage using the high power setting to increase throughput.

As shown by reference number 415, the UE 120 may detect a transition from the second stage to a third stage of the DRX active time, shown as Stage C. In some aspects, the UE 120 may detect this transition based at least in part on receiving a signal from the base station 110, in a similar manner as described above. Additionally, or alternatively, the UE 120 may detect this transition based at least in part on expiration of a timer, such as a stage-based data inactivity (SDI) timer (e.g., an FSDI timer, a second stage data inactivity timer, and/or the like). Based at least in part on detecting the transition, the UE 120 may configure the low power setting and may operate using the low power setting to conserve power. In example 400, the UE 120 operates using the low power setting (e.g., with a lower power consumption rate than the high power setting) in the third stage until the end of the DRX active time, upon which the UE 120 enters a DRX inactive state.

In some aspects, the UE 120 may operate using a configuration (e.g., a set of parameter values) until the SDI timer expires. When the SDI timer expires, the UE 120 may operate using a different configuration (e.g., a different set of parameter values). In some aspects, a duration of the SDI timer may be indicated to the UE 120 by a base station 110, such as in association with a DRX configuration, in an RRC message, in another signaling message, and/or the like. In some aspects, the duration of the SDI timer may be shorter than a duration of a DRX inactivity timer configured for the UE 120 so that the UE 120 has an opportunity to enter the low power setting state prior to the end of the DRX active state (e.g., because expiration of the DRX inactivity timer triggers a transition from the DRX active state to the DRX inactive state).

In some aspects, the UE 120 and/or the base station 110 may reset the SDI timer when the UE 120 transmits or receives new data (e.g., data that is not a retransmission of previously transmitted or received data). For example, the SDI timer may be reset based at least in part on scheduling of new data by DCI, a configured grant, semi-persistent scheduling (SPS), and/or the like. Resetting the SDI timer may cause a high power setting to continue to be applied when the UE 120 is actively transmitting and/or receiving data (e.g., new data), thereby improving throughput. In some aspects, if the SDI timer expires and the UE 120 enters a low power setting state, but the DRX inactivity timer has not yet expired (e.g., meaning that the UE 120 is still in the DRX active state), then transmission or reception of new data may cause the SDI timer to be reset (in addition to the DRX inactivity timer). In this case, resetting the SDI timer may trigger a transition from the low power setting state to the high power setting state so that the UE 120 can improve throughput for transmission or reception of the new data.

As indicated above, FIG. 4 is provided as an example. Other examples may differ from what is described with respect to FIG. 4.

Figure 5:
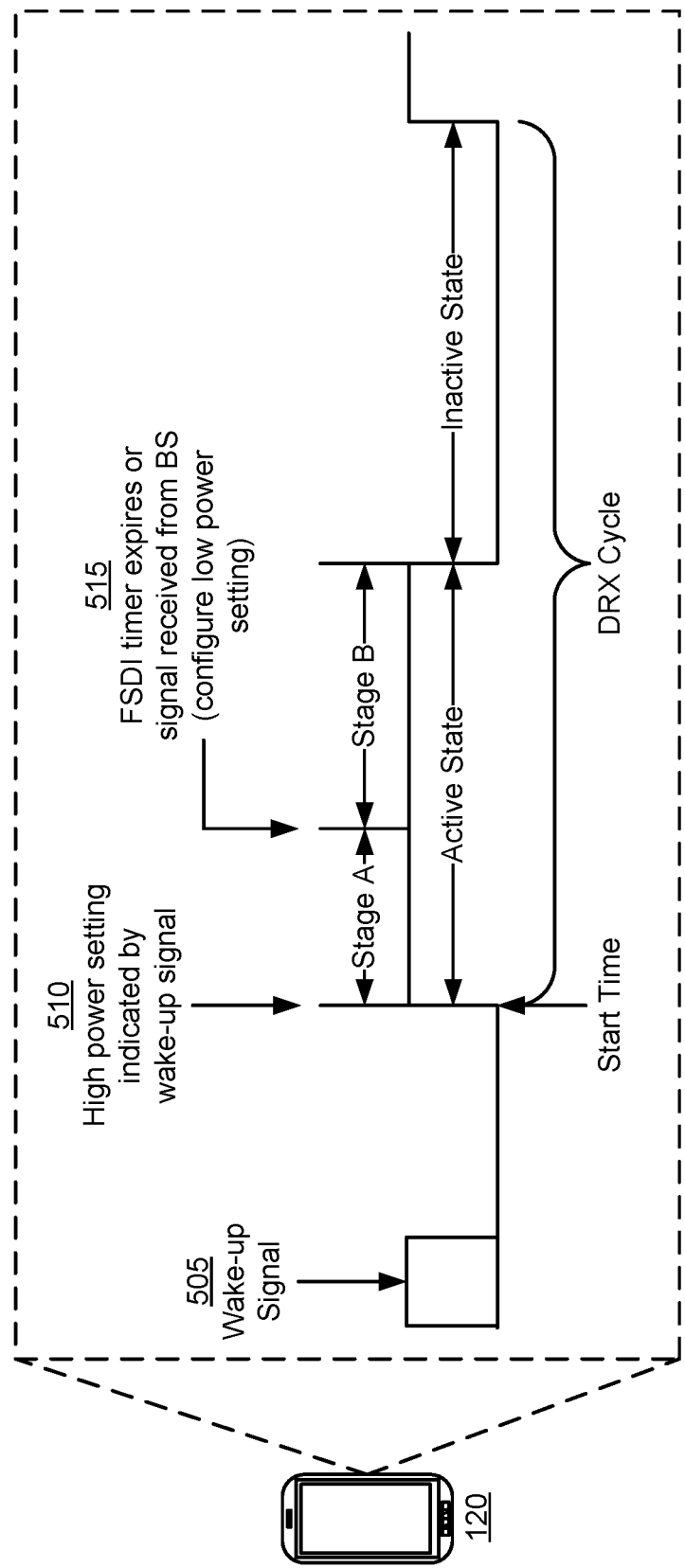

FIG. 5 is a diagram illustrating another example 500 of adaptation of power parameter values in DRX.

As shown by reference number 505, in some aspects, the UE 120 may receive a wake-up signal prior to the start of the DRX active time (e.g., during the DRX inactive state). The wake-up signal may indicate whether there is data available for the UE 120, and may trigger the UE 120 to enter the DRX active state (e.g., at the end of the DRX inactive state) if there is data available for the UE 120. If the wake-up signal is not received by the UE 120, or if the wake-up signal indicates that there is no data available for the UE 120, then the UE 120 may remain in the DRX inactive state (e.g., may not enter the DRX active state).

In some aspects, a set of parameter values to be used by the UE 120 at the start of the DRX active time (e.g., during a first stage of the DRX active time) may be indicated in the wake-up signal. For example, the set of parameter values may be included in the wake-up signal (e.g., via an explicit indication), or may be indicated using an index or another type of indicator, in a similar manner as described elsewhere herein. For example, if the wake-up signal indicates that there is data available for the UE 120, then the wake-up signal may indicate a set of parameter values corresponding to a high power setting to improve throughput of the data.

As shown by reference number 510, the UE 120 may configure the high power setting (e.g., using the first set of parameter values described above in connection with FIG. 3) at the start of a DRX active time based at least in part on the indication included in the wake-up signal. The start of the DRX active time may be included in a first stage of the DRX active time, shown as Stage A. During this time, there may be data available for the UE 120 (e.g., as indicated by the wake-up signal), so the UE 120 may operate using the high power setting (e.g., with a greater power consumption rate than the low power setting) and may transmit and/or receive data during the second stage using the high power setting to increase throughput.

As shown by reference number 515, the UE 120 may detect a transition from the first stage to a second stage of the DRX active time, shown as Stage B. In some aspects, the UE 120 may detect this transition based at least in part on receiving a signal from the base station 110, in a similar manner as described above. Additionally, or alternatively, the UE 120 may detect this transition based at least in part on expiration of a timer, such as an SDI timer (e.g., an FSDI timer, a second stage data inactivity timer, and/or the like), in a similar manner as described above. In some aspects, a duration of the SDI timer may be indicated in the wake-up signal (e.g., depending in an amount of data available for the UE 120). Based at least in part on detecting the transition, the UE 120 may configure the low power setting and may operate using the low power setting to conserve power. In example 500, the UE 120 operates using the low power setting (e.g., with a lower power consumption rate than the high power setting) in the second stage until the end of the DRX active time, upon which the UE 120 enters a DRX inactive state.

By operating in the manner described herein, the UE 120 may be flexibly configured to operate using different power consumption rates for different stages of a DRX active time. Operating in this manner may achieve improved throughput when the UE 120 has data to transmit and/or receive, and may achieve power savings when the UE 120 does not have data to transmit and/or receive.

As indicated above, FIG. 5 is provided as an example. Other examples may differ from what is described with respect to FIG. 5.

Figure 6:
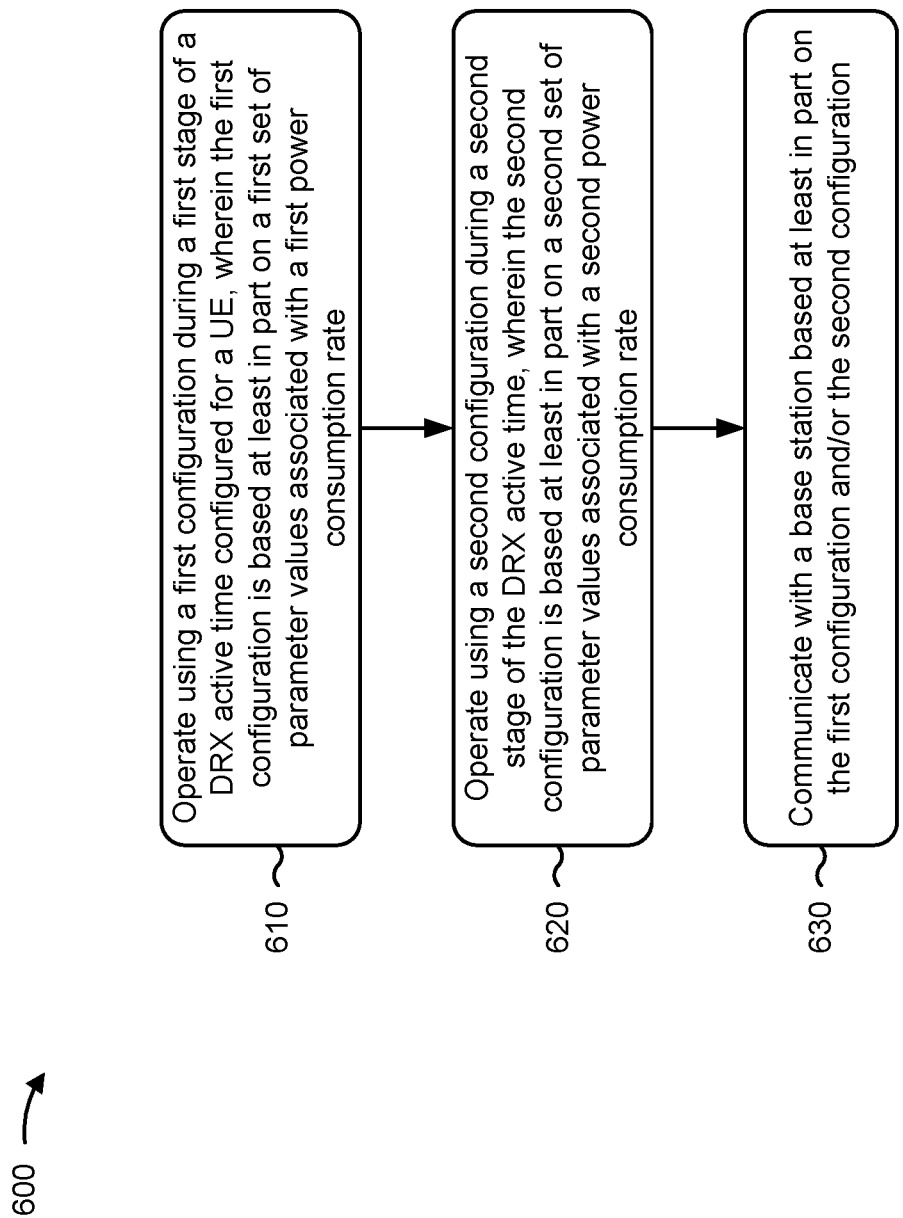
FIGS. 6 and 7 are flow charts of example methods of wireless communication.

FIG. 6 is a flow chart of a method 600 of wireless communication. The method may be performed by a UE (e.g., the UE 120, the apparatus 802/802' described below, and/or the like).

At 610, the UE may operate using a first configuration during a first stage of a DRX active time configured for the UE, wherein the first configuration is based at least in part on a first set of parameter values associated with a first power consumption rate. For example, the UE (e.g., using controller/processor 280, transmit processor 264, TX MIMO processor 266, MOD 254, antenna 252, DEMOD 254, MIMO detector 256, receive processor 258, and/or the like) may operate using a first configuration during a first stage of a DRX active time configured for the UE, as described above. In some aspects, the first configuration is based at least in part on a first set of parameter values. In some aspects, the first set of parameter values is associated with a first power consumption rate. In some aspects, the first stage includes a start time of the DRX active time.

At 620, the UE may operate using a second configuration during a second stage of the DRX active time, wherein the second configuration is based at least in part on a second set of parameter values associated with a second power consumption rate. For example, the UE (e.g., using controller/processor 280, transmit processor 264, TX MIMO processor 266, MOD 254, antenna 252, DEMOD 254, MIMO detector 256, receive processor 258, and/or the like) may operate using a second configuration during a second stage of the DRX active time, as described above. In some aspects, the second configuration is based at least in part on a second set of parameter values. In some aspects, the second set of parameter values is associated with a second power consumption rate.

At 630, the UE may communicate with a base station based at least in part on the first configuration and/or the second configuration. For example, the UE (e.g., using controller/processor 280, transmit processor 264, TX MIMO processor 266, MOD 254, antenna 252, DEMOD 254, MIMO detector 256, receive processor 258, and/or the like) may communicate with a base station based at least in part on the first configuration. Additionally, or alternatively, the UE 120 may communicate with a base station based at least in part on the second configuration. In some aspects, the UE may communicate with the base station during a stage where there is data to be transmitted or received by the UE, and may use a set of parameter values configured for that stage.

Method 600 may include additional aspects, such as any single aspect or any combination of aspects described below and/or in connection with one or more other processes described elsewhere herein.

In some aspects, the first power consumption rate is greater than the second power consumption rate. In some aspects, the second power consumption rate is greater than the first power consumption rate. In some aspects, the first set of parameter values and the second set of parameter values are selected from a plurality of sets of parameter values indicated to the UE by a base station. In some aspects, an indication to apply at least one of the first set of parameter values during the first stage or the second set of parameter values during the second stage is indicated to the UE by a base station.

In some aspects, the first set of parameter values are based at least in part on a network traffic load. In some aspects, the first set of parameter values are indicated in a wake-up signal received before the DRX active time, wherein the wake-up signal indicates that there is data available for the UE.

In some aspects, the UE operates using the first configuration until expiration of a timer. In some aspects, a duration of the timer is indicated to the UE by a base station. In some aspects, a duration of the timer is shorter than a duration of a DRX inactivity timer. In some aspects, method 600 includes resetting the timer when the UE transmits or receives new data. In some aspects, method 600 includes applying the first configuration when the timer is reset. In some aspects, the UE operates using the first configuration prior to expiration of the timer, and the UE operates using the second configuration after expiration of the timer.

In some aspects, the UE operates using at least one of the first configuration during the first stage or the second configuration during the second stage based at least in part on a signal from a base station. In some aspects, the signal is indicated in downlink control information, a media access control (MAC) control element (CE), or a combination thereof. In some aspects, the UE operates using the first configuration prior to receiving a signal from a base station, and the UE operates using the second configuration after receiving the signal. In some aspects, the first set of parameter values and the second set of parameter values include one or more parameter values for at least one of: a frequency domain configuration parameter, a time domain configuration parameter, a scheduling configuration parameter, a multiple input multiple output configuration parameter, a discontinuous reception configuration parameter, a processing timeline configuration parameter, a downlink control channel configuration parameter, a wakeup signal configuration parameter, a radio resource management configuration parameter, or a combination thereof.

Although FIG. 6 shows example blocks of a method 600 of wireless communication, in some aspects, the method 600 may include additional blocks, fewer blocks, different blocks, or differently arranged blocks than those shown in FIG. 6. Additionally, or alternatively, two or more blocks shown in FIG. 6 may be performed in parallel.

Figure 7:
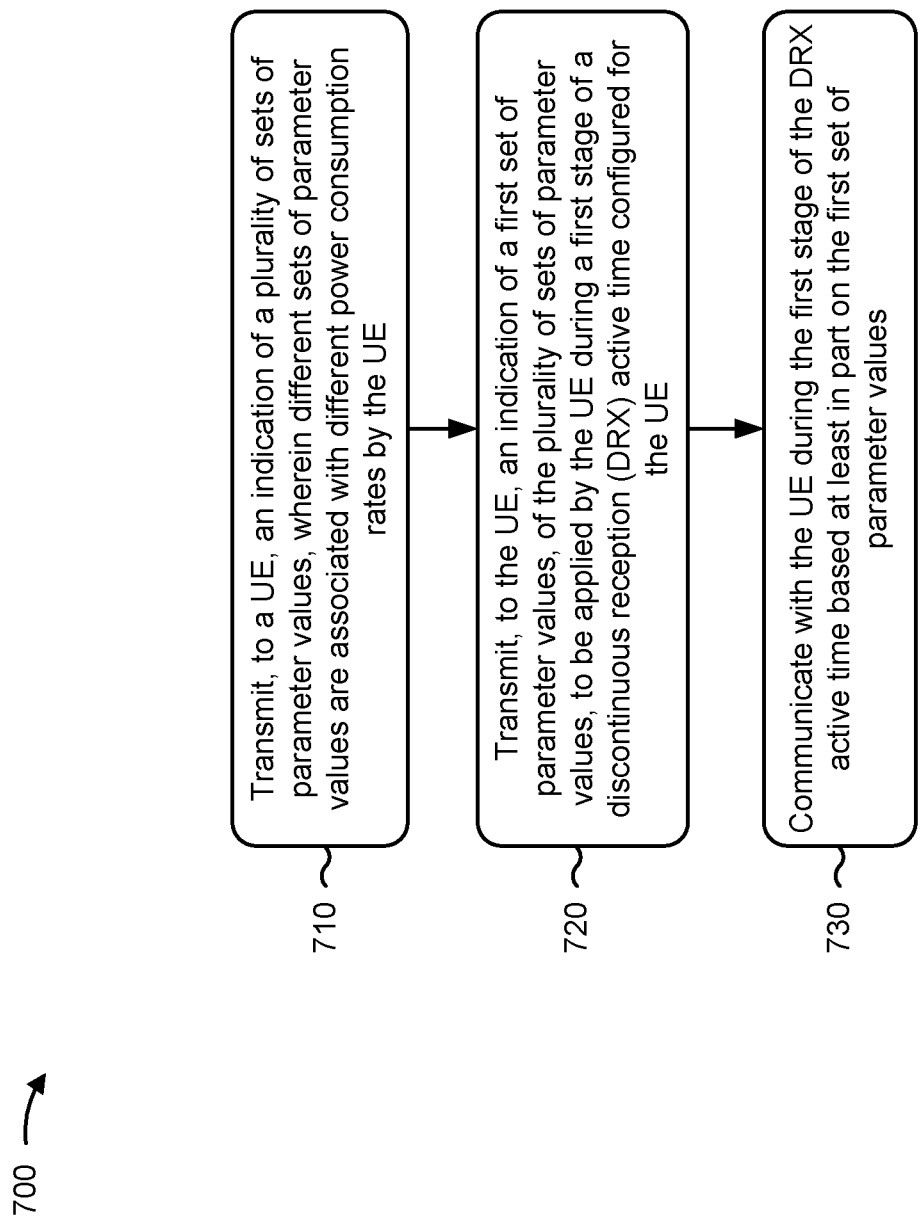

FIG. 7 is a flow chart of a method 700 of wireless communication. The method may be performed by a base station (e.g., the base station 110, the apparatus 1002/1002', and/or the like).

At 710, the base station may transmit, to a UE, an indication of a plurality of sets of parameter values, wherein different sets of parameter values are associated with different power consumption rates by the UE. For example, the base station (e.g., using controller/processor 240, transmit processor 220, TX MIMO processor 230, MOD 232, antenna 234, and/or the like) may transmit an indication of a plurality of sets of parameter values to a UE, as described above. In some aspects, different sets of parameter values are associated with different power consumption rates by the UE. In some aspects, the plurality of sets of parameter values are indicated in a radio resource control (RRC) message.

At 720, the base station may transmit, to the UE, an indication of a first set of parameter values, of the plurality of sets of parameter values, to be applied by the UE during a first stage of a DRX active time configured for the UE. For example, the base station (e.g., using controller/processor 240, transmit processor 220, TX MIMO processor 230, MOD 232, antenna 234, and/or the like) may transmit an indication of a first set of parameter values to be applied by the UE during a first stage of a DRX active time configured for the UE, as described above. In some aspects, the first set of parameter values may be selected from the plurality of sets of parameter values. In some aspects, the first stage includes a start time of the DRX active time.

At 730, the base station may communicate with the UE during the first stage of the DRX active time based at least in part on the first set of parameter values. For example, the base station (e.g., using antenna 234, DEMOD 232, MIMO detector 236, receive processor 238, controller/processor 240, transmit processor 220, TX MIMO processor 230, MOD 232, and/or the like) may communicate with the UE during the first stage of the DRX active time based at least in part on the first set of parameter values, as described above. In some aspects, the base station may communicate with the UE during a stage where there is data to be transmitted or received by the UE, and may use a set of parameter values configured for that stage to communicate with the UE.

Method 700 may include additional aspects, such as any single aspect or any combination of aspects described below and/or in connection with one or more other processes described elsewhere herein.

In some aspects, method 700 includes determining that a second stage of the DRX active time is active, and communicating with the UE during the second stage of the DRX active time based at least in part on a second set of parameter values of the plurality of sets of parameter values. In some aspects, the determination that the second stage is active is based at least in part on expiration of a timer. In some aspects, a duration of the timer is indicated to the UE by the base station. In some aspects, a duration of the timer is shorter than a duration of a DRX inactivity timer. In some aspects, method 700 includes resetting the timer when new data is transmitted to or received from the UE. In some aspects, method 700 includes communicating with the UE based at least in part on the first set of parameter values when the timer is reset. In some aspects, the first set of parameter values are used to communicate with the UE prior to expiration of the timer, and the second set of parameter values are used to communicate with the UE after expiration of the timer.

In some aspects, the determination that the second stage is active is based at least in part on an indication received from the UE. In some aspects, the determination that the second stage is active is based at least in part on whether data is available for the UE. In some aspects, method 700 includes transmitting a signal, to the UE, indicating that the second stage is active. In some aspects, the signal is indicated in downlink control information, a media access control (MAC) control element (CE), or a combination thereof. In some aspects, an indication to apply the second set of parameter values during the second stage is indicated to the UE by the base station. In some aspects, an indication to apply the first set of parameter values during the first stage is indicated to the UE by the base station.

In some aspects, the first set of parameter values are determined based at least in part on a network traffic load determined or estimated by the base station. In some aspects, the first set of parameter values are indicated in a wake-up signal transmitted before the DRX active time, wherein the wake-up signal indicates that there is data available for the UE. In some aspects, the plurality of sets of parameter values include one or more parameter values for at least one of: a frequency domain configuration parameter, a time domain configuration parameter, a scheduling configuration parameter, a multiple input multiple output configuration parameter, a discontinuous reception configuration parameter, a processing timeline configuration parameter, a downlink control channel configuration parameter, a wakeup signal configuration parameter, a radio resource management configuration parameter, or a combination thereof.

Although FIG. 7 shows example blocks of a method 700 of wireless communication, in some aspects, the method 700 may include additional blocks, fewer blocks, different blocks, or differently arranged blocks than those shown in FIG. 7. Additionally, or alternatively, two or more blocks shown in FIG. 7 may be performed in parallel.

Figure 8:
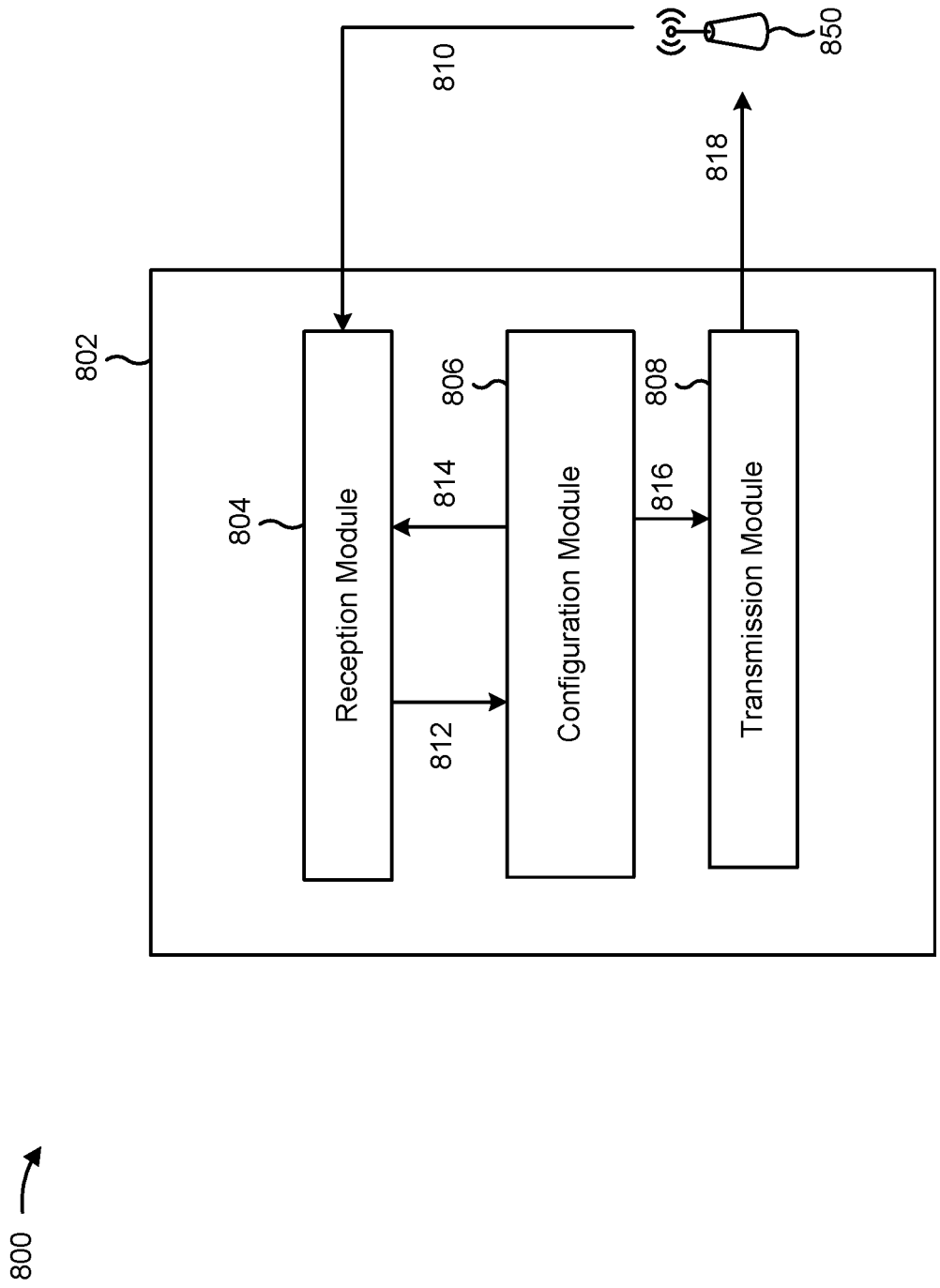
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. The apparatus 802 may be a UE. In some aspects, the apparatus 802 includes a reception module 804, a configuration module 806, a transmission module 808, and/or the like.

The reception module 804 may receive, as information 810 from an apparatus 850 (e.g., a base station 110 and/or the like), an indication of a plurality of sets of parameter values, an indication of a first set of parameter values associated with a first stage of a DRX active time, an indication of a second set of parameter values associated with a second stage of the DRX active time, and/or the like. The reception module 804 may provide such information to the configuration module 806 as information 812. The configuration module 806 may configure the apparatus 802 to operate using a first configuration during the first stage of the DRX active time based at least in part on the first set of parameter values, may configure the apparatus 802 to operate using a second configuration during the second stage of the DRX active time based at least in part on the second set of parameter values, and/or the like. For example, the configuration module 806 may configure the reception module 804 using information 814 (e.g., one or more parameter values of a set of parameter values), may configure the transmission module 808 using information 816 (e.g., one or more parameter values of a set of parameter values), and/or may configure one or more other components and/or modules of the apparatus 802 (e.g., one or more components of UE 120 described above in connection with FIG. 2). The apparatus 802 may communicate with the apparatus 850 based at least in part on the configuration (e.g., to receive further information 810 and/or to transmit information 818).

The apparatus may include additional modules that perform each of the blocks of the algorithm in the aforementioned method 600 of FIG. 6. Each block in the aforementioned method 600 of FIG. 6 may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
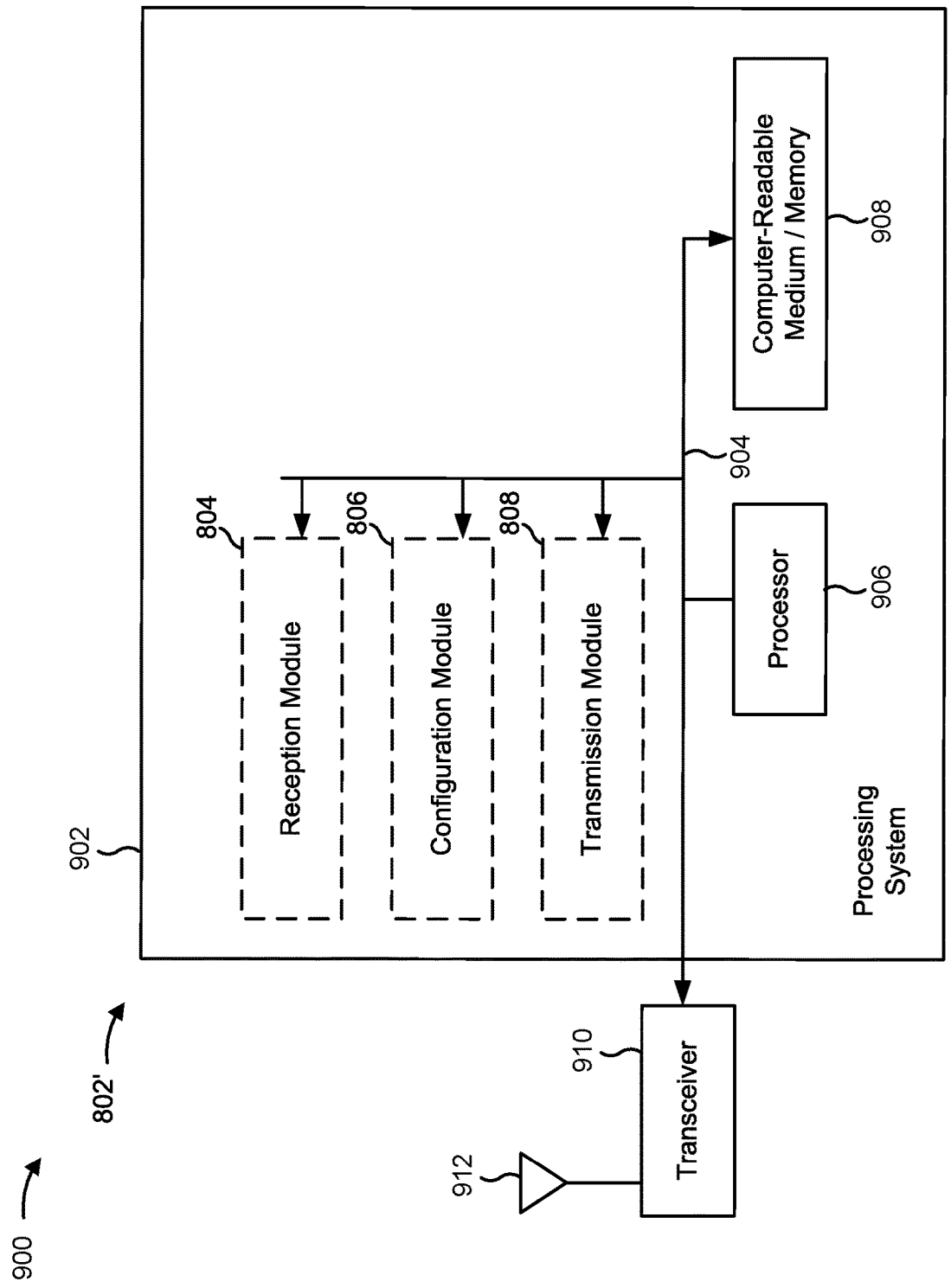
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a UE.

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, and/or the like, and the computer-readable medium/memory 908. The bus 904 may also link various other circuits such as timing sources, peripherals, voltage regulators, and power management circuits, which are well known in the art, and therefore will not be described any further.

The processing system 902 may be coupled to a transceiver 910. The transceiver 910 is coupled to one or more antennas 912. The transceiver 910 provides a means for communicating with various other apparatuses over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 808, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described herein for any particular apparatus. The computer-readable medium/memory 908 may also be used for storing data that is manipulated by the processor 906 when executing software. The processing system further includes at least one of the modules 804, 806, 808, and/or the like. The modules may be software modules running in the processor 906, resident/stored in the computer readable medium/memory 908, one or more hardware modules coupled to the processor 906, or some combination thereof. The processing system 902 may be a component of the UE 120 and may include the memory 282 and/or at least one of the TX MIMO processor 266, the RX processor 258, and/or the controller/processor 280.

In some aspects, the apparatus 802/802' for wireless communication includes means for operating using a first configuration during a first stage of a DRX active time configured for the UE, wherein the first configuration is based at least in part on a first set of parameter values associated with a first power consumption rate; means for operating using a second configuration during a second stage of the DRX active time, wherein the second configuration is based at least in part on a second set of parameter values associated with a second power consumption rate; and/or the like. The aforementioned means may be one or more of the aforementioned modules of the apparatus 802 and/or the processing system 902 of the apparatus 802' configured to perform the functions recited by the aforementioned means. As described elsewhere herein, the processing system 902 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 9 is provided as an example. Other examples may differ from what is described in connection with FIG. 9.

Figure 10:
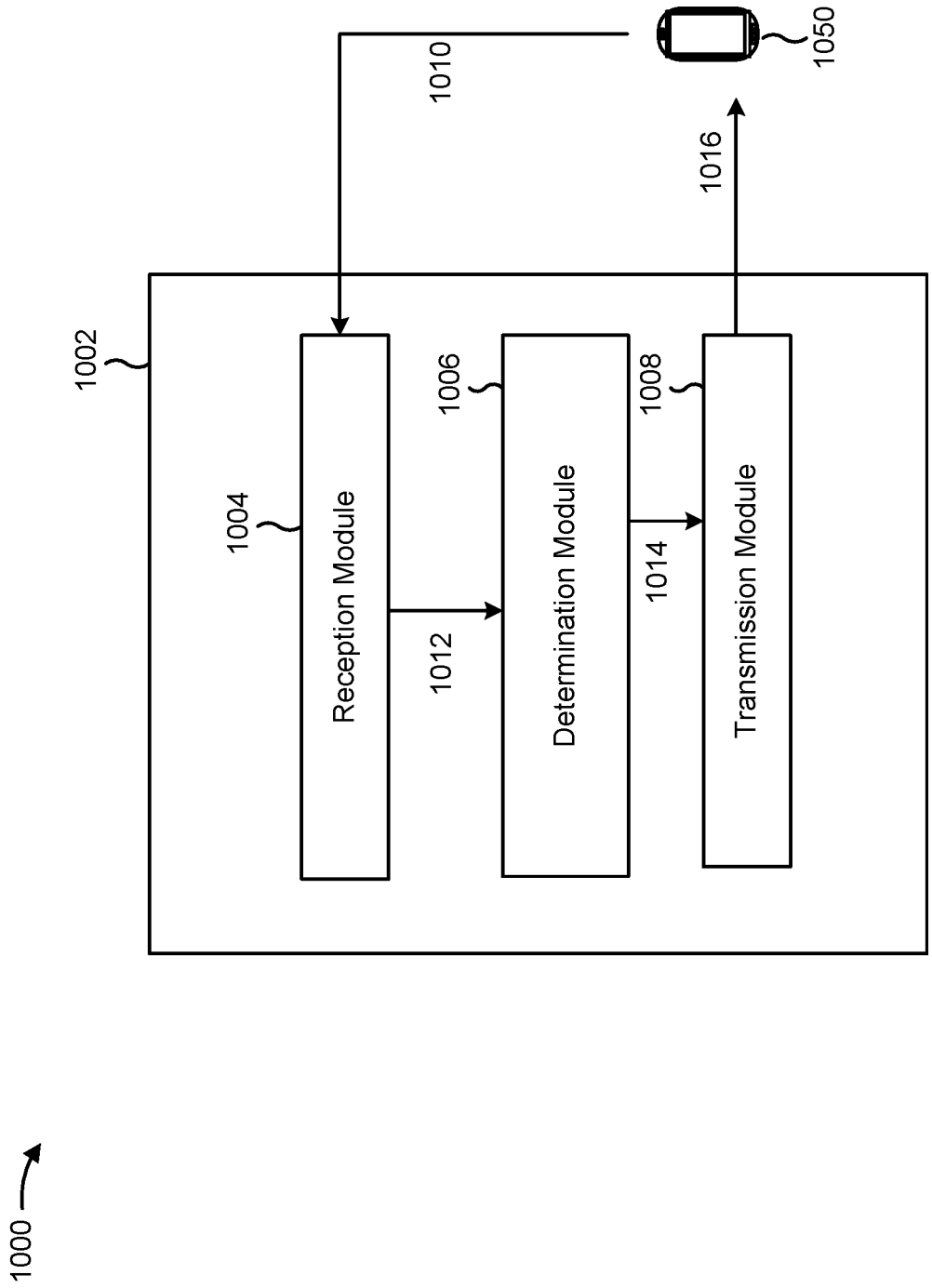
FIG. 10 is a conceptual data flow diagram illustrating the data flow between different modules/means/components in another example apparatus.

FIG. 10 is a conceptual data flow diagram 1000 illustrating the data flow between different modules/means/components in an example apparatus 1002. The apparatus 1002 may be a base station. In some aspects, the apparatus 1002 includes a reception module 1004, a determination module 1006, a transmission module 1008, and/or the like.

The determination module 1006 may determine a first set of parameter values, a second set of parameter values, and/or the like, corresponding to different configurations to be configured for an apparatus 1050 (e.g., a UE 120). In some aspects, the reception module 1004 may receive information 1010 from the apparatus 950 (e.g., a capability report and/or the like) and may provide such information to the determination module 1006 as information 1012. The determination module 1006 may use such information 1012 to determine the first set of parameter values, the second set of parameter values, and/or the like. The determination module 1006 may provide information regarding the set(s) of parameter values to the transmission module 1008 as information 1014. The transmission module 1008 may transmit, to the apparatus 1050 as information 1016, an indication of a plurality of sets of parameter values, an indication of a first set of parameter values, an indication of a second set of parameter values, and/or the like. The apparatus 1002 may communicate with the apparatus 1050 (e.g., by receiving further information 1010 or transmitting further information 1016) based at least in part on a set of parameter values and/or a stage of a DRX active time.

The apparatus may include additional modules that perform each of the blocks of the algorithm in the aforementioned method 700 of FIG. 7. Each block in the aforementioned method 700 of FIG. 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 10 are provided as an example. In practice, there may be additional modules, fewer modules, different modules, or differently arranged modules than those shown in FIG. 10. Furthermore, two or more modules shown in FIG. 10 may be implemented within a single module, or a single module shown in FIG. 10 may be implemented as multiple, distributed modules. Additionally, or alternatively, a set of modules (e.g., one or more modules) shown in FIG. 10 may perform one or more functions described as being performed by another set of modules shown in FIG. 10.

Figure 11:
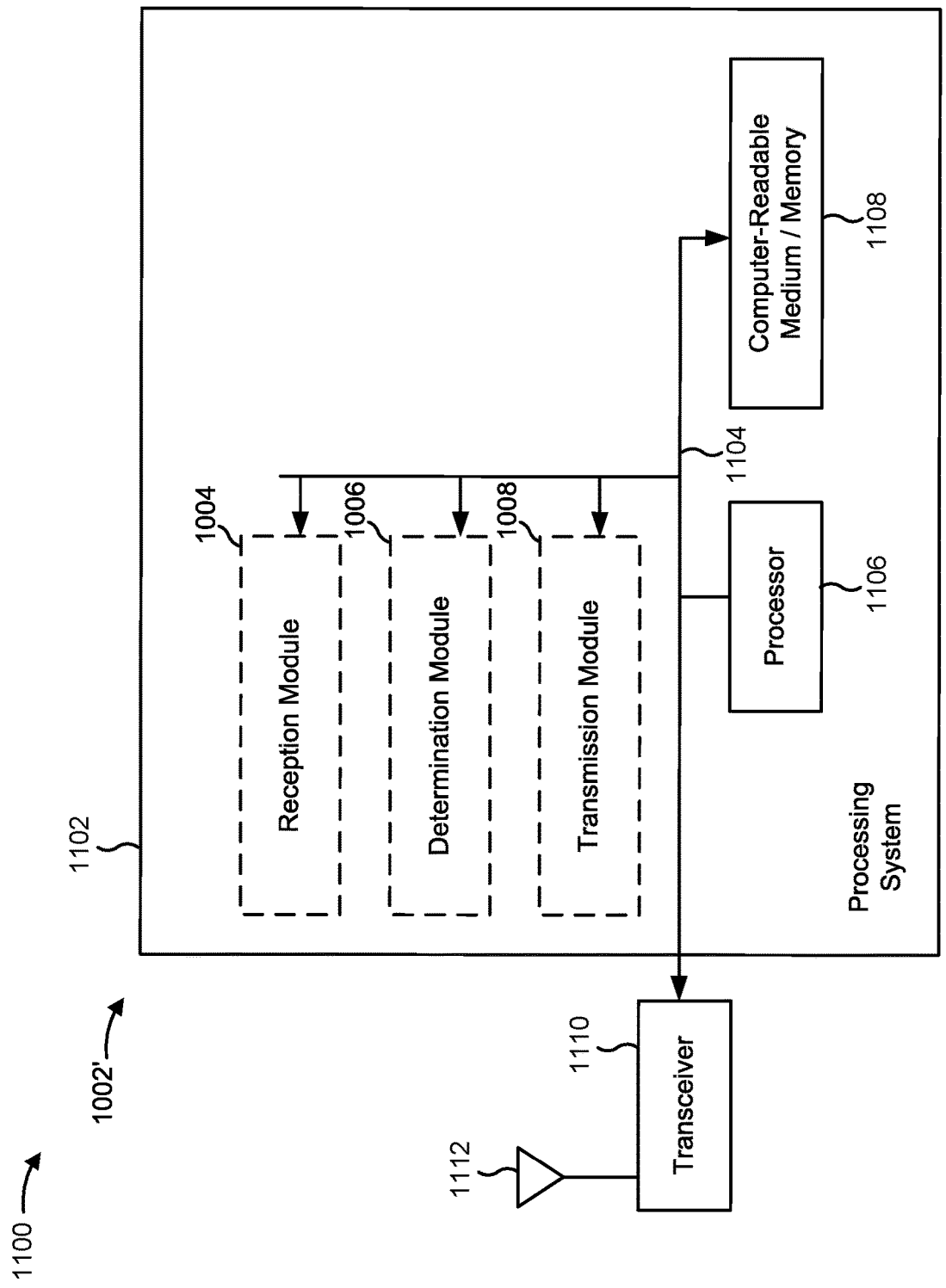
FIG. 11 is a diagram illustrating another example of a hardware implementation for an apparatus employing a processing system.

FIG. 11 is a diagram 1100 illustrating an example of a hardware implementation for an apparatus 1002' employing a processing system 1102. The apparatus 1002' may be a base station.

The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware modules, represented by the processor 1106, the modules 1004, 1006, 1008, and/or the like, and the computer-readable medium/memory 1108. The bus 1104 may also link various other circuits such as timing sources, peripherals, voltage regulators, and power management circuits, which are well known in the art, and therefore will not be described any further.

The processing system 1102 may be coupled to a transceiver 1110. The transceiver 1110 is coupled to one or more antennas 1112. The transceiver 1110 provides a means for communicating with various other apparatuses over a transmission medium. The transceiver 1110 receives a signal from the one or more antennas 1112, extracts information from the received signal, and provides the extracted information to the processing system 1102, specifically the reception module 1004. In addition, the transceiver 1110 receives information from the processing system 1102, specifically the transmission module 1008, and based at least in part on the received information, generates a signal to be applied to the one or more antennas 1112. The processing system 1102 includes a processor 1106 coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described herein for any particular apparatus. The computer-readable medium/memory 1108 may also be used for storing data that is manipulated by the processor 1106 when executing software. The processing system further includes at least one of the modules 1004, 1006, 1008, and/or the like. The modules may be software modules running in the processor 1106, resident/stored in the computer readable medium/memory 1108, one or more hardware modules coupled to the processor 1106, or some combination thereof. The processing system 1102 may be a component of the base station 110 and may include the memory 242 and/or at least one of the TX MIMO processor 230, the RX processor 238, and/or the controller/processor 240.

In some aspects, the apparatus 1002/1002' for wireless communication includes means for transmitting, to a UE, an indication of a plurality of sets of parameter values, wherein different sets of parameter values are associated with different power consumption rates by the UE; means for transmitting, to the UE, an indication of a first set of parameter values, of the plurality of sets of parameter values, to be applied by the UE during a first stage of a DRX active time configured for the UE; means for communicating with the UE during the first stage of the DRX active time based at least in part on the first set of parameter values; and/or the like. The aforementioned means may be one or more of the aforementioned modules of the apparatus 1002 and/or the processing system 1102 of the apparatus 1002' configured to perform the functions recited by the aforementioned means. As described elsewhere herein, the processing system 1102 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 11 is provided as an example. Other examples may differ from what is described in connection with FIG. 11.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
   operating using a first configuration during a first stage of a period, of a discontinuous reception (DRX) cycle, where the UE is in a DRX active state,
      wherein the first configuration is based at least in part on a first set of parameter values associated with a first power consumption rate; and
   operating using a second configuration during a second stage of the period, of the DRX cycle, where the UE is in the DRX active state,
      wherein the second configuration is based at least in part on a second set of parameter values associated with a second power consumption rate.

2. The method of claim 1, wherein the first power consumption rate is greater than the second power consumption rate or the second power consumption rate is greater than the first power consumption rate.

3. The method of claim 1, wherein the first set of parameter values and the second set of parameter values are selected from a plurality of sets of parameter values indicated to the UE by a base station.

4. The method of claim 1, wherein an indication to apply at least one of the first set of parameter values during the first stage or the second set of parameter values during the second stage is indicated to the UE by a base station.

5. The method of claim 1, wherein the first stage includes a start time of the DRX active state.

6. The method of claim 1, wherein the first set of parameter values are based at least in part on a network traffic load.

7. The method of claim 1, wherein the first set of parameter values are indicated in a wake-up signal received before the period, of the DRX cycle, where the UE is in the DRX active state, wherein the wake-up signal indicates that there is data available for the UE.

8. The method of claim 1, wherein the UE operates using the first configuration until expiration of a timer.

9. The method of claim 8, wherein a duration of the timer is indicated to the UE by a base station.

10. The method of claim 8, wherein a duration of the timer is shorter than a duration of a DRX inactivity timer.

11. The method of claim 8, further comprising resetting the timer when the UE transmits or receives new data.

12. The method of claim 8, further comprising applying the first configuration when the timer is reset.

13. The method of claim 8, wherein the UE operates using the first configuration prior to the expiration of the timer, and wherein the UE operates using the second configuration after the expiration of the timer.

14. The method of claim 1, wherein the UE operates using at least one of the first configuration during the first stage or the second configuration during the second stage based at least in part on a signal from a base station.

15. The method of claim 14, wherein the signal is indicated in downlink control information, a media access control (MAC) control element (CE), or a combination thereof.

16. The method of claim 1, wherein the UE operates using the first configuration prior to receiving a signal from a base station, and wherein the UE operates using the second configuration after receiving the signal.

17. The method of claim 1, wherein the first set of parameter values and the second set of parameter values include one or more parameter values for at least one of:
   a frequency domain configuration parameter,
   a time domain configuration parameter,
   a scheduling configuration parameter,
   a multiple input multiple output configuration parameter,
   a discontinuous reception configuration parameter,
   a processing timeline configuration parameter,
   a downlink control channel configuration parameter,
   a wakeup signal configuration parameter, or
   a radio resource management configuration parameter.

18. A method of wireless communication performed by a base station, comprising:
   transmitting, to a user equipment (UE), an indication of a plurality of sets of parameter values,
      wherein different sets of parameter values are associated with different power consumption rates by the UE;
   transmitting, to the UE, an indication of a first set of parameter values, of the plurality of sets of parameter values, to be applied by the UE during a first stage of a period, of a discontinuous reception (DRX) cycle, where the UE is in a DRX active state,
      wherein a second set of parameter values, of the plurality of sets of parameter values, are to be applied by the UE during a second stage of the period, of the DRX cycle, where the UE is the DRX active state; and communicating with the UE during the first stage based at least in part on the first set of parameter values.

19. The method of claim 18, further comprising:
determining that the second stage is active; and
communicating with the UE during the second stage based at least in part on the second set of parameter values.

20. The method of claim 19, wherein the determination that the second stage is active is based at least in part on expiration of a timer.

21. The method of claim 19, wherein the determination that the second stage is active is based at least in part on an indication received from the UE or is based at least in part on whether data is available for the UE.

22. The method of claim 19, further comprising transmitting a signal, to the UE, indicating that the second stage is active.

23. The method of claim 18, wherein an indication to apply the second set of parameter values during the second stage is indicated to the UE by the base station.

24. The method of claim 18, wherein the plurality of sets of parameter values are indicated in a radio resource control (RRC) message.

25. The method of claim 18, wherein the first stage includes a start time of the DRX active state.

26. The method of claim 18, wherein the first set of parameter values are determined based at least in part on a network traffic load determined or estimated by the base station.

27. The method of claim 18, wherein the first set of parameter values are indicated in a wake-up signal transmitted before the period, of the DRX cycle, where the UE is in the DRX active state, wherein the wake-up signal indicates that there is data available for the UE.

28. The method of claim 18, wherein the plurality of sets of parameter values include one or more parameter values for at least one of:
a frequency domain configuration parameter,
a time domain configuration parameter,
a scheduling configuration parameter,
a multiple input multiple output configuration parameter,
a discontinuous reception configuration parameter,
a processing timeline configuration parameter,
a downlink control channel configuration parameter,
a wakeup signal configuration parameter, or
a radio resource management configuration parameter.

29. A user equipment (UE) for wireless communication, comprising:
a memory; and
one or more processors coupled to the memory, the memory and the one or more processors configured to:
operate using a first configuration during a first stage of a period, of a discontinuous reception (DRX) cycle, where the UE is in a DRX active state,
wherein the first configuration is based at least in part on a first set of parameter values associated with a first power consumption rate; and
operate using a second configuration during a second stage of the period, of the DRX cycle, where the UE is in the DRX active state,
wherein the second configuration is based at least in part on a second set of parameter values associated with a second power consumption rate.

30. A base station for wireless communication, comprising:
a memory; and
one or more processors coupled to the memory, the memory and the one or more processors configured to:
transmit, to a user equipment (UE), an indication of a plurality of sets of parameter values,
wherein different sets of parameter values are associated with different power consumption rates by the UE;
transmit, to the UE, an indication of a first set of parameter values, of the plurality of sets of parameter values, to be applied by the UE during a first stage of a period, of a discontinuous reception (DRX) cycle, where the UE is in a DRX active state,
wherein a second set of parameter values, of the plurality of sets of parameter values, are to be applied by the UE during a second stage of the period, of the DRX cycle, where the UE is the DRX active state; and
communicate with the UE during the first stage based at least in part on the first set of parameter values.

* * * * *